United States Patent
Hancock et al.

(10) Patent No.: US 9,548,999 B2
(45) Date of Patent: Jan. 17, 2017

(54) OBFUSCATION OF LAWFULLY AUTHORIZED ELECTRONIC SURVEILLANCE

(71) Applicant: Cable Television Laboratories, Inc., Louisville, CO (US)

(72) Inventors: David Hancock, Broomfield, CO (US); Sumanth Channabasappa, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 73 days.

(21) Appl. No.: 14/266,855

(22) Filed: May 1, 2014

(65) Prior Publication Data

US 2015/0319195 A1 Nov. 5, 2015

Related U.S. Application Data

(60) Provisional application No. 61/986,906, filed on May 1, 2014.

(51) Int. Cl.
*H04L 29/06* (2006.01)
*G06F 7/58* (2006.01)

(52) U.S. Cl.
CPC .......... *H04L 65/1006* (2013.01); *G06F 7/588* (2013.01); *H04L 63/306* (2013.01)

(58) Field of Classification Search
CPC combination set(s) only.
See application file for complete search history.

(56) References Cited

U.S. PATENT DOCUMENTS

| 2004/0255126 | A1* | 12/2004 | Reith | H04L 63/083 713/183 |
| 2011/0141947 | A1* | 6/2011 | Li | H04M 3/2281 370/259 |
| 2011/0302232 | A1* | 12/2011 | Vasyltsov | G06F 7/588 708/251 |
| 2013/0273886 | A1* | 10/2013 | Mohajeri | H04W 12/06 455/411 |

FOREIGN PATENT DOCUMENTS

EP  2053820  *  4/2009  ............. H04L 29/06

OTHER PUBLICATIONS

PacketCable1.5 Specifications, CMS to CMS Signaling, PKT-SP-CMSS1.5-I06-100120.
PacketCable 2.0, Electronic Surveillance Intra-Network Specification, PKT-SP-ES-INF-C01-140314.
Private Session Initiation Protocol (SIP) Proxy-to-Proxy Extensions for Supporting the PacketCable Distributed Call Signaling Architecture, RFC 5503.

* cited by examiner

*Primary Examiner* — Edward Zee
*Assistant Examiner* — Chi Nguy
(74) *Attorney, Agent, or Firm* — Great Lakes Intellectual Property, PLLC

(57) ABSTRACT

The obfuscation of information included in Session Initiation Protocol (SIP) invites for the purposes of facilitating Lawfully Authorized Electronic Surveillance (LAES) is contemplated. The obfuscation may include the use of LAES headers with invites of sessions that require surveillance as well as those not requiring surveillance and/or selecting values or otherwise influencing parameter selection of data included in LAES headers according to a validity function, a shared secret, a key or other construct.

10 Claims, 2 Drawing Sheets

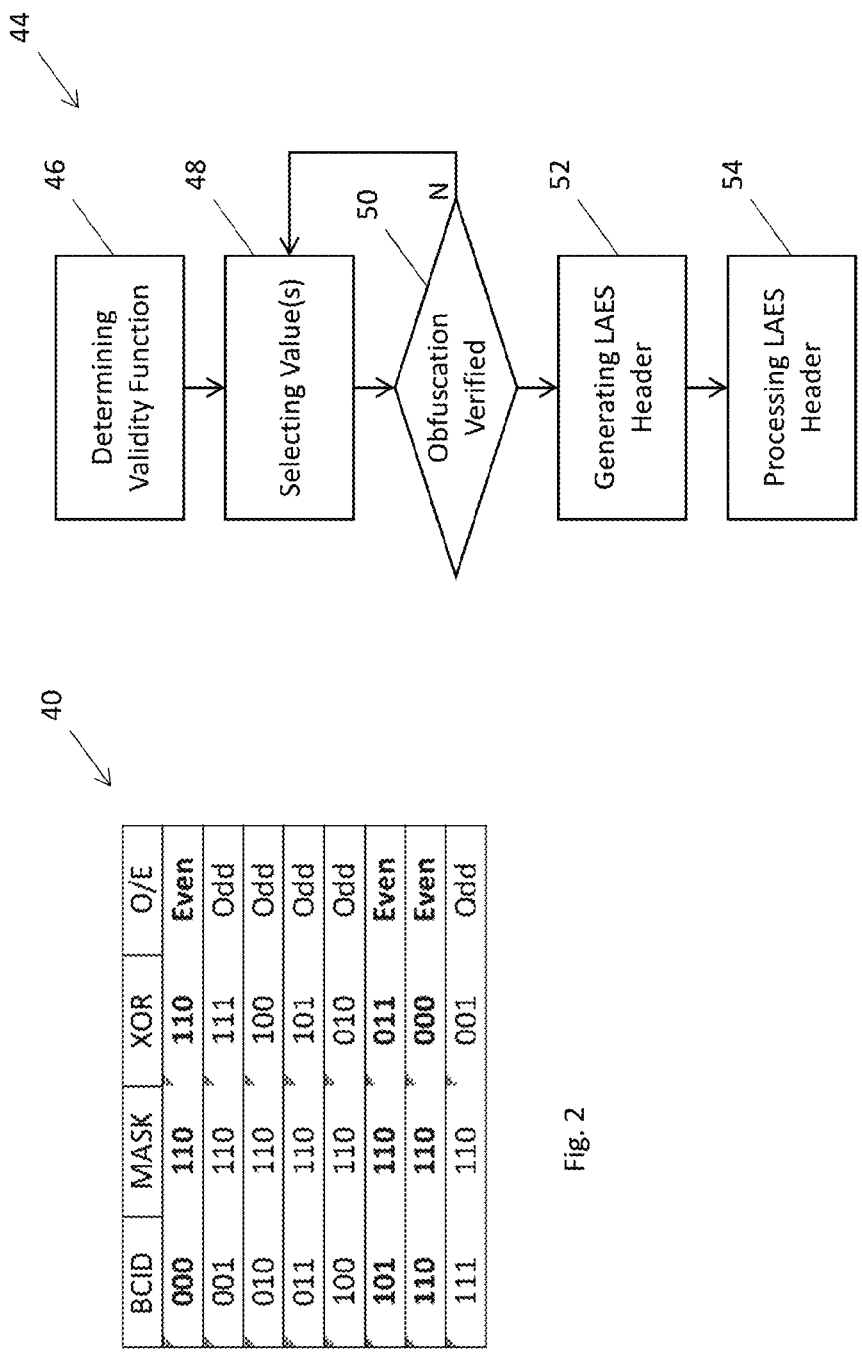

OBFUSCATION OF LAWFULLY AUTHORIZED ELECTRONIC SURVEILLANCE

CROSS-REFERENCE TO RELATED APPLICATIONS

This claims the benefit of U.S. provisional Application No. 61/986,906, filed May 1, 2014, the disclosure of which is incorporated in its entirety by reference herein.

TECHNICAL FIELD

The present invention relates to obfuscating or otherwise masking data typically used to indicate sessions or other electronic exchanges being under surveillance, such as but not necessary limited to facilitating obfuscation of Lawfully Authorized Electronic Surveillance (LAES) headers used to facilitate surveilling Session Initiation Protocol (SIP) sessions.

BACKGROUND

PacketCable 1.5, CMS to CMS Signaling (PKT-SP-CMSS1.5-I06-100120) and PacketCable 2.0, Electronic Surveillance Intra-Network Specification (PKT-SP-ES-INF-001-140314), disclosed in the above-referenced provisional application, the disclosures of which are hereby incorporated by reference in their entireties, relate to environments where Lawfully Authorized Electronic Surveillance (LAES) headers are used to facilitate surveilling Session Initiation Protocol (SIP) sessions. PacketCable 1.5 specification describes the PacketCable Call Management Server (CMS) to CMS Signaling protocol intended for use by a CMS to communicate with another CMS in order to support packet-based voice and other real-time multimedia applications. PacketCable 2.0 specifies the lawfully authorized electronic surveillance requirements for the components internal to the PacketCable architecture that support SIP based PacketCable clients. These specifications/protocols, as well as others aimed at supporting SMP sessions or other types of sessions between two or more entities, may be required to comply with law enforcement requirements to provide surveillance or other tracking and monitoring of messages, content, packets, data, etc. as exchange therein.

Individuals, computers or other entities may be able to ascertain whether surveillance is being performed on session-by-session basis simply from identifying the use of LAES headers within corresponding messages, e.g., sessions utilizing LAES headers may be assumed to be under surveillance while sessions not relying upon or otherwise utilizing LAES headers may be assumed to not be under surveillance. One non-limiting aspect of the present invention contemplates obfuscating the use of LAES headers so as to make it more difficult to determine or less likely to successfully infer surveillance based on the presence or absence of data, fields, etc. within LAES headers.

BRIEF DESCRIPTION OF THE DRAWINGS

FIG. 2 illustrates a graph of a validity function in accordance with one non-limiting aspect of the present invention.

FIG. 3 illustrates a flowchart for a method of obfuscating LAES headers in accordance with one non-limiting aspect of the present invention.

DETAILED DESCRIPTION

Figure 1:
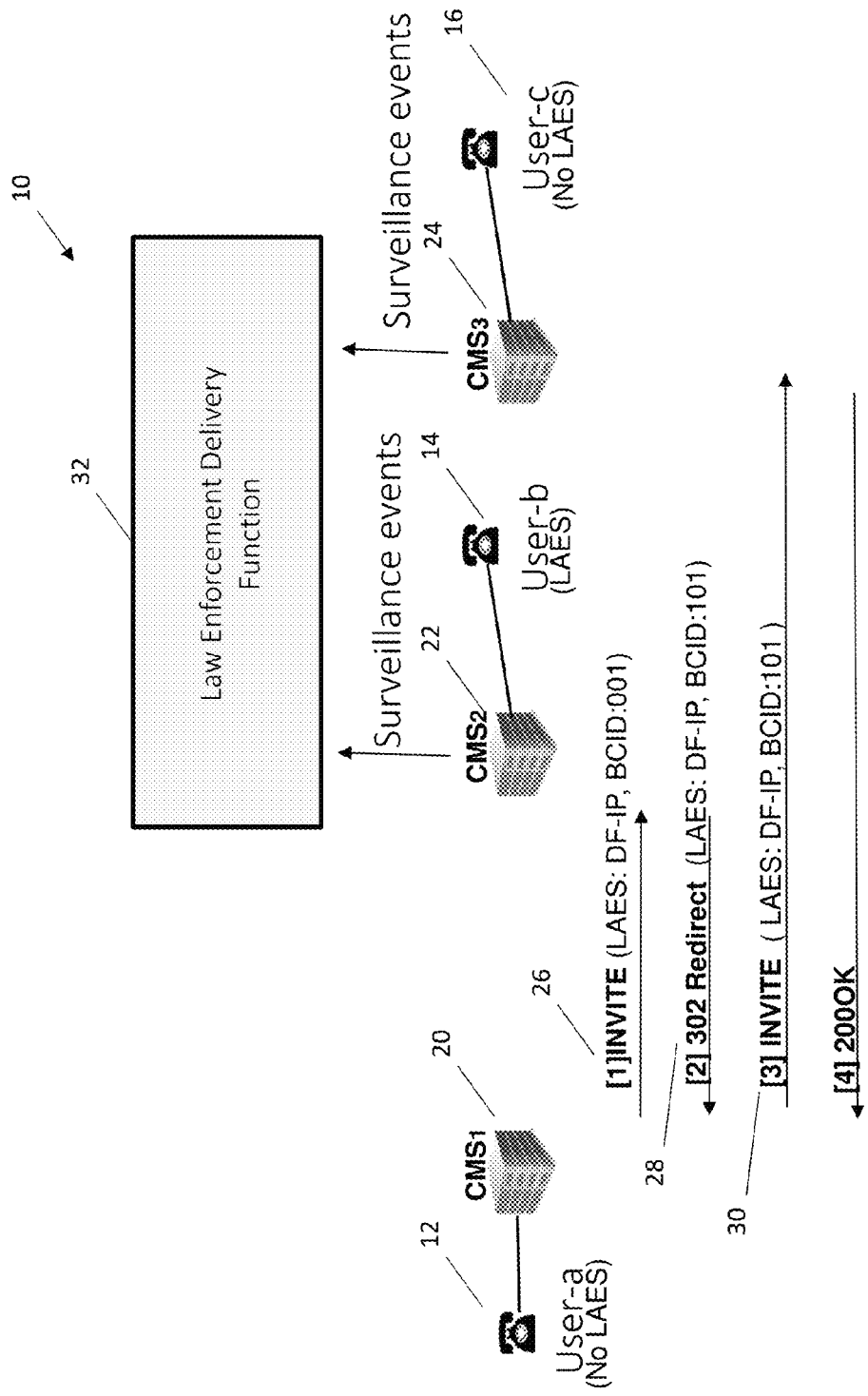
FIG. 1 illustrates a system for obfuscating surveillance in accordance with one non-limiting aspect of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a system 10 for obfuscating session surveillance in accordance with one non-limiting aspect of the present invention. The system 10 is illustrated with respect to facilitating a session between a first device 12 and a second device 14 wherein the second device 14 enables a redirect to a third device 16. The session may correspond with a Session Initiation Protocol (SIP) session or any other type of electronic communication or relationship between two or more of the devices 12, 14, 16. The operation of the system 10 is described with respect to facilitating packet-based voice and/or real-time multimedia applications for exemplary non-limiting purposes as the session may be established to facilitate any type of electronic exchange. The devices 12, 14, 16 are shown descriptively as telephones but may be any other type of device having capabilities sufficient to facilitate the electronic signal exchange, messaging, transmissions, etc. The devices 12, 14, 16 are shown to be communicating by way of first, second and third servers 20, 22, 24, labeled as management servers (CMSs), such as those described in the above-referenced PacketCable 1.5 for exemplary non-limiting purposes. The servers 20, 22, 24 may also be call session control functions (CSCFs) as described in PacketCable 2.0 or any type of device having capabilities consistent with the operations contemplated herein.

The system 10 illustrates an exemplary environment where data, messages or other signaling may be exchanged between two or more devices for any number of reasons and applications, such as to facilitate Voice over Internet Protocol (VoIP) phone calls, television signaling, cellular phone calls, Internet access, data transmissions, etc. In order to comply with law enforcement obligations or to otherwise assist law enforcement agencies in monitoring information, data, metadata, messages, etc. exchanged within the session. One non-limiting aspect of the present invention contemplates facilitating use of Lawfully Authorized Electronic Surveillance (LAES) headers (shown as "LAES: (field), (field), etc."). The LAES headers may correspond with those described in PacketCable 1.5 or 2.0, as well as those described in Private Session Initiation Protocol (SIP) Proxy-to-Proxy Extensions for Supporting the PacketCable Distributed Call Signaling Architecture, published as RFC 5503 by the Internet Engineering Task Force (IETF), the disclosure of which is hereby incorporated by reference in its entirety, or other suitable standard sufficient to facilitate operations consistent with or related to those contemplated with the use of LAES headers.

The LAES headers may be data constructs included within SIP messaging, such as the illustrated SIP invite 26 and SIP redirect 28, or other suitable syntax sufficient to enable the contemplated surveillance related operations. The LAES headers may include a plurality of fields populated by the devices 12, 14, 16 and/or the CMSs 20, 22, 24 with values, alphanumeric characters, bits, etc. The LAES header, also interchangeably referred to as a P-DCS-LAES header, may be used to indicate that the user identified in the Request-URI is under surveillance. The LAES header may contain fields for the following: 1) IP address:port of Delivery Function (DF); 2) billing-correlation-ID (BCID) BCID; 3) IP address:port of Content Function (CF); and 4) call content channel identifier (CCID) field. The BCID and CCID may be random numbers generated with a random number generator to correlate the multiple events (BCID) and to correlate media packets (CCID) for the session. The Delivery Function provides the interface with the Law Enforcement Agency (address of law-enforcement server to receive the call events for this user), generically shown as the law enforcement delivery function 32. The DF may act as a mediation function in that it takes the information supplied by the internal components and formats the information as required by the interface to the Law Enforcement Agency. The Collection Function collects and decodes the information provided by the DF and provides the necessary presentation and storage functionality as required by the Law Enforcement Agency (address of law-enforcement server to receive the media for this user).

While the LAES header is described with respect to the four fields identified above, all of the fields may not need to be present in a properly formatted LAES header, e.g., the IP address and port of the DF and the BCID may be mandatory fields while the IP address and port of the CF and the CCID may be optional fields. Of course, the LAES header may include additional fields or additional syntax without deviating from the scope contemplation of the present invention. FIG. 1 illustrates the LAES header included within SIP messaging having fields for the IP address and port for the DF (DF-IP) and a BCID (001, 101). The illustrated session includes a redirect in order to demonstrate one non-limiting aspect of the present invention where a user associated with the first device 12 and a user associated with the third device 16 are not under surveillance or not desired to be under surveillance while a user associated with the second device 14 is desired to be under surveillance. In the illustrated scenario, LAES headers are included within each of the SIP invites and redirects (LAES headers could be included in other messages originating from one of the devices to instigate a session or to otherwise signify events for what's law-enforcement may desire surveillance).

While the first user and third user are not requested to be under surveillance, one non-limiting aspect of the present invention contemplates including the LAES header within their associated SIP messaging in order to facilitate obfuscating the surveillance of the second user. The obfuscation of the second user may be achieved by inclusion of the LAES header in messages associated with the users not under surveillance, e.g., the first and third devices, so that computers, entities and individuals having capabilities to detect or otherwise gain awareness of the LAES headers are unable to infer surveillance from the presence or absence of LAES headers within session related messaging as all or substantially all of the messaging utilized with LAES headers would include LAES headers. Of course, the present invention is not necessarily so limited to including LAES headers in every SIP messaging or in every SIP invite, e.g., if the inference of surveillance from the presence or absence of LAES headers is undesirable or otherwise not a concern, the first LAES header may be removed from the first SIP invite 26 originating from the first device 12. If the first LAES header is removed from the first invite 26, the second CMS may nonetheless add the second LAES header to the redirect message 28 so that the first device includes a matching third LAES header within a second invite 30 correspondingly transmitted to the third CMS 24 for the purposes of implementing the redirect and establishing a session with the third CMS 24 in a manner that apprises the third CMS 24 that the second user is to be placed under surveillance.

As one skilled in the art will appreciate, there are a number of scenarios and a number of different messages or reasons for adding LAES headers at different points during a session. The exemplary scenario shown in FIG. 1 is but one of many session use cases were LAES headers may be added or become necessary depending on whether messages will be traversing a device desired to be under surveillance. One non-limiting aspect of the present invention contemplates facilitating obfuscation of the LAES headers through manipulation of the values or other parameters included within the LAES header fields. In addition to or instead of the above-described obfuscation process, one non-limiting aspect of the present invention contemplates use of a validity function to facilitate obfuscating the LAES header information. The validity function may be a shared secret, an algorithm or other logical construct shared amongst CMSs for the purposes of deciphering whether LAES headers are fake or dummy headers or whether the LAES headers are actually intended to instigate surveillance operations. The scenario shown in FIG. 1 illustrates the law-enforcement delivery function 32 being used to facilitate surveilling content and/or media passing through the second and third CMS 22, 24 due to the second device 14 being under surveillance according to the contemplated validity function.

FIG. 2 illustrates a graph 40 of a validity function in accordance with one non-limiting aspect of the present invention. The graph illustrates a BCID column, a mask column, and exclusive-or column (XOR) and a result column (O/E). The BCID column includes a plurality of random numbers/values randomly generated for the BCID field of LAES headers. The mask column may include a plurality of values generated to coincide with the BCID values. The exclusive-or column indicates a result associated with XOR'ing corresponding BCID and mask values. The result column indicates a result of the XOR being either odd or even, i.e., a first or a second type of result. The odd and even determination may correspond with a numerical representation of the binary result associated with the XOR. When surveillance is desired, the CMS originating an invite or CMS associated with a device to be placed under surveillance, may select the BCID value included within the BCID of the corresponding LAES header such that an even result is generated when XOR'd with the mask. When surveillance is undesirable, the CMS may be used to generate an odd result. The mask and the XOR or other function used to process the BCID or other field included with in the LAES header may be shared or kept private between the CMSs so as to thwart others from determining whether the corresponding LAES header is intended to convey a need to perform surveillance.

One non-limiting aspect of the present invention contemplates varying the mask and/or the function (e.g., XOR) so as to provide additional security against the likelihood that one may be able to discover the shared secret used for differentiating LAES headers intended for surveillance from those not intended for surveillance. The mask, for example, may be varied such that a different mask is used on a certain day of the week or at a certain time of day, which may require the BCID to be selected relative to the mask being used proximate in time to construction of the session in order to properly decipher the corresponding LAES header for the purposes of determining whether surveillance is or is not to occur. Optionally, instead of varying the mask and/or in cooperation with varying the mask, the function may be changed to another function, such as an OR'ing, whereby a different type or result may be generated or the results may be interpreted differently, e.g., instead of relying upon an odd or even determination, numerical values matching predetermined results are greater than a threshold may be utilized to indicate whether surveillance is desired. The graph illustrates the use of binary values to facilitate explaining the operations contemplated herein and is not intended to limit the scope contemplation of the present invention as non-binary values or other alphanumeric characters may be used for the BCID, the mask, etc., including varying the values with changes in the mask and/or function. Surveilling FIG. 3 illustrates a flowchart 44 for a method of obfuscating LAES headers in accordance with one non-limiting aspect of the present invention. The method may be embodied in a non-transitory computer-readable medium having a plurality of instructions operable with a CMS, a controller or other device suitable to facilitating the operations contemplated herein. The method is generally described with respect to facilitating surveillance of an SIP session relying upon LAES headers to indicate a need for surveillance. The LAES headers are described for exemplary non-limiting purposes as the present invention fully contemplates facilitating its use with other types of messaging surveillance or other status constructs where surveillance is implemented according to fields or values included within headers and/or other data associated with sessions outside of the header. The method is also described with respect to a CMS being one of many types of devices suitable for processing the LAES headers in accordance with the operations contemplated herein in order to facilitate engaging or disengaging surveillance of the associated session as other devices may be similarly employed. The surveillance being performed on the session may correspond with any of the surveilling techniques or operations described in the above-referenced specifications and papers or any other type of surveillance activity consistent with the scope contemplation of the present invention.

Block 46 relates to determining a validity function. The validity function relates to an algorithm or other logical construct being used to process the LAES headers in accordance with the present invention. The validity function may correspond with a shared secret or other knowledge-based requirement intended to be kept from users or others outside of the CMSs or the service provider's associated therewith. The validity function may change over time and may be encrypted or otherwise secured to limit the likelihood that it is obtained or intelligibly obtained by illicit users. The validity function is described for exemplary non-limiting purposes to correspond with a mask and an XOR operand where the mask is XOR'd with one or more fields included within them LAES header to determine whether the corresponding session should be placed under surveillance, e.g., the BCID field. The mask and/or XOR operand may be periodically changed or variable as a function of time or other parameters so as to help prevent illicit detection thereof, e.g., the mask may be variable depending on a time of day or other parameter, the XOR operand may process various fields within the LAES header depending on the time of day or other parameter, etc.

Block 48 relates to selecting values for the LAES header. The values may be selected for fields included with the LAES header, such as alphanumeric characters, bits, numbers, etc. The values may be selected prior to a CMS transmitting a corresponding SIP invite, a SIP redirect or other SIP message suitable to beginning or instigating surveillance of the associated session. The values may be selected by the CMS or other device responsible for instigating or otherwise facilitating the transmission of invite prior to the invite being transmitted, e.g., the values may be selected before the message having the LAS header is transmitted. The values selected for the LAS header may be selected depending on whether the corresponding session should be placed under surveillance, e.g., certain values may be selected to generate results when subsequently subjected to the validity function in order to indicate a need for surveillance while other values may be similarly selected to indicate no need for surveillance. The CMS or other entity tasked with populating the LAES header may be responsible for identifying the need for indicating surveillance of the corresponding session, e.g., the CMS may hold the responsibility for identifying users, devices required for surveillance and including triggers or other parameters necessary to perform or not perform surveillance.

Block 50 relates to verifying whether the desired obfuscation has been achieved. The desired obfuscation may take multiple forms in accordance with the present invention, including assigning or associating LAES headers with each session or each invite, redirect, etc. so as to prevent the detection of surveillance operation simply from the presence or lack of an LAES header. The inclusion of LAES headers within all SIP messaging or substantially all messaging sufficient to transmit a LAES headers may be sufficient to thwart entities from snooping for the presence of LAES headers as an indicator of surveillance. Another obfuscation verification may correspond with determining whether appropriate values have been selected for the LAES headers in order to generate the desired surveillance result with the validity function when subsequently applied at the CMS or other device receiving the corresponding invite, redirect, etc. In the event the validity function is to be applied to a BCID field included within the LAS header, the values selected for the corresponding BCID field may need to be checked in order to ensure an appropriate surveillance result is achieved. In a case of the BCID headers being selected with a random number generator, the random number may need to be checked or process with the validity function in order to determine whether the corresponding result indicates the need for surveillance or the lack of a need for surveillance, e.g., whether the corresponding result is odd or even.

Block 52 relates to generating the LAES header once the desired obfuscation is verified and/or attaching the LAS header to the corresponding SIP invite or other message. This may include selecting multiple values for the BCID field using the random number generator until a suitable result is achieved. Once the desired result is achieved, the LAES header may be generated, attached, applied or otherwise included within suitable SIP messaging in order to engage the contemplated surveillance functions. Block 54 relates to processing the LAS header for a corresponding SIP messaging when received at a suitable recipient and determining whether surveillance operation should be engaged. The processing of the LAS header may be similar to the process of determining the validity function in Block 46. In the event the validity function changes over time, the recipient may perform a lookup operation or otherwise attempt to identify the validity function used at the originating CMS at the time of transmitting the corresponding message. Optionally, this may be accomplished using a values such as a time of day or as a function of information included within the corresponding SIP messaging, e.g., a key or other token may be included therewith to identify the appropriate validity function to the receiving CMS. In the event a redirect or other operations to be formed, the processes may be repeated until the corresponding session is established and surveillance can begin.

As supported above, one non-limiting aspect of the present invention contemplates obscuring the P-DCS-LAES header carried in call signaling messages so that service provider personnel who have access to call signaling cannot identify users under surveillance. Instead of including the P-DCS-LAES header only in call establishment signaling messages for calls that are being surveilled, one non-limiting aspect of the present invention contemplates including the LAES header in all call establishment messages. Optionally, this may include defining a mechanism that makes it easy for network signaling proxies to distinguish between "dummy" and "real" LAES headers, but makes it difficult for the casual human observer to identify the few "real" LAES headers form the many "dummy" LAES headers. The P-DCS-LAES header may be populated in a SIP INVITE request in accordance with one non-limiting aspect of the present invention to indicate that the user identified in the Request-URI is under surveillance. To distinguish between "real" and "dummy" LAES headers, one non-limiting aspect of the present invention proposes that a function be applied to the BCID. If the results of the function will indicate whether the header is real or dummy, e.g., stated programmatically, "IF [f(BCID)=x] is TRUE then header is real, ELSE header is dummy.

The function "f" and the result "x" may be both secret (known only to the machines that generate and consume LEAS headers). One example function could be—provide a pre-configured "mask"; if an XOR of the BCID+Mask results in a "odd" set of bits then call is being monitored. If not, then it is not. The operator would define the function, and could change the function periodically and/or include other information like date to make detection more difficult. The dummy LEAS headers could randomly include call-content parameters. One advantage of the present invention may be to obscure the LEAE header without having to obscure the whole message in a TLS session, particularly since the use of TLS for SIP signaling is expensive, complex, and hinders the operator's ability to resolve call failure issues.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for obscuring use of a Lawfully Authorized Electronic Surveillance (LAES) header included within Session Initiation Protocol (SIP) messaging used to support a session associated with packet-based voice and/or real-time multimedia applications, the method comprising:
  determining a validity function to be used in processing a field included in the LAES header for the purpose of assessing whether the session is to be placed under surveillance, the validity function generating a first result if the session is to be placed under surveillance and a second result if the session is not to be placed under surveillance;
  determining a randomly generated first value to be included in the field being processed with the validity function to facilitate obfuscating whether the session is to be placed under surveillance;
  determining the field to be a billing-correlation-ID (BCID) field of the LAES header having the first value;
  randomly generating the first value for the BCID field using a random number generator;
  assessing a first random number generated using the random number generator with the validity function, the first random number resulting in the validity function generating the first result;
  assessing a second random number generated using the random number generator with the validity function, the second random number resulting in the validity function generating the second result; and
  selecting the first random number as the first value for the BCID field if surveillance is desired and selecting the second random number as the first value for the BCID field if surveillance is not desired.

2. The method claim 1 further comprising including the first or second random number within the BCID field of an SIP invite used to originate the session.

3. The method of claim 1 further comprising transmitting the first value within an SIP invite used to originate the session without encrypting the first value.

4. The method of claim 3 further comprising transmitting a mask independently of the SIP invite to a server tasked with placing the session under surveillance, the server processing the mask and the first value with the validity function to determine whether the session is to be placed under surveillance.

5. A method for obscuring use of a Lawfully Authorized Electronic Surveillance (LAES) header included within Session Initiation Protocol (SIP) messaging used to support a session associated with packet-based voice and/or real-time multimedia applications, the method comprising:
  determining a validity function to be used in processing a field included in the LAES header for the purpose of assessing whether the session is to be placed under surveillance, the validity function generating a first result if the session is to be placed under surveillance and a second result if the session is not to be placed under surveillance;
  determining a randomly generated first value to be included in the field being processed with the validity function to facilitate obfuscating whether the session is to be placed under surveillance;
  determining the validity function to be an exclusive-or function where a mask is XOR'd with the field, resulting in the first or second result depending on a second value selected for the mask; and
  selecting the second value for the mask based on the randomly generated first value so as to provide the first result as an odd number and to provide the second result as an even number.

6. A method for obscuring use of a Lawfully Authorized Electronic Surveillance (LAES) headers included within Session Initiation Protocol (SIP) invites, the method comprising:
  determining a first plurality of SIP invites associated with SIP sessions requiring surveillance;

determining a second plurality of SIP invites associated with SIP sessions not requiring surveillance;

specifying a validity function to be used in determining whether the SIP sessions require surveillance;

including LAES headers within each of the first and second plurality of SIP invites, including generating random values for one or more fields included within the LAES headers of the first and second plurality of SIP invites to be processed with the validity function when determining whether the SIP sessions require surveillance;

determining sessions to require surveillance if the validity function generates a first result for the corresponding LAES header and to not require surveillance if the validity function generates a second result for the corresponding LAES header;

selecting the validity function to be an exclusive-or function; and transmitting a mask independently of the SIP invites to a server tasked with placing the SIP sessions under surveillance, the server processing one or more of the one or more fields with the mask and the exclusive-or function to produce one of an odd number and an even number, the first result being determined if the odd number is produced and the second result being determined if the even number is produced.

7. The method claim 6 further comprising including the values as at least part of a billing-correlation-ID (BCID) field included within each LAES header, the BCID field being at least one of the one or more fields processed with the validity function to determine whether the associated session requires or does not require surveillance.

8. The method of claim 6 further comprising generating the random values using a random number generator.

9. A non-transitory computer-readable medium having a plurality of instructions operable with a processor of a call management server (CMS) or a call session control function (CSCF) to facilitate surveilling session initiation protocol (SIP) sessions, the instructions comprising:

determining a first Lawfully Authorized Electronic Surveillance (LAES) header included within a first SIP invite associated with a first SIP session;

processing at least a first portion of the first LAES header with a validity function to produce a first result, the first portion including a randomly generated value;

determining surveillance of the first SIP session to be required if the first result is of a first type and determining surveillance of the first SIP session to be unnecessary if the first result is of a second type;

implementing surveillance of the first SIP session after determining the first result to be of the first type;

determining a second LAES header included within a second SIP invite associated with a second SIP session;

processing at least a second portion of the second LAES header with the validity function to produce a second result, the second portion including a randomly generated value; and determining surveillance of the second SIP session to be required if the second result is of the first type and determining surveillance of the second SIP session to be unnecessary if the second result is of the second type.

10. The non-transitory computer-readable medium of claim 9, wherein the instructions further comprising determining the validity function to include XOR'ing at least the first portion with a mask transmitted independently of the first SIP invite.

* * * * *